United States Patent [19]

Gustafsson

[11] 4,385,686

[45] May 31, 1983

[54] FEEDING DEVICE

[75] Inventor: Berth U. Gustafsson, Österskär, Sweden

[73] Assignee: Projectus Industriprodukter AB, Bromma, Sweden

[21] Appl. No.: 197,091

[22] PCT Filed: Jan. 30, 1980

[86] PCT No.: PCT/SE80/00027

§ 371 Date: Oct. 6, 1980

§ 102(e) Date: Oct. 6, 1980

[87] PCT Pub. No.: WO80/01679

PCT Pub. Date: Aug. 21, 1980

[30] Foreign Application Priority Data

Feb. 8, 1979 [SE] Sweden ................................ 7901119

[51] Int. Cl.³ .............................................. B65G 47/22
[52] U.S. Cl. .................................... 198/434; 198/620; 221/218; 221/259
[58] Field of Search ........................ 198/624, 626–628, 198/620, 604, 605, 347, 434; 221/217–218, 253, 259

[56] References Cited

U.S. PATENT DOCUMENTS 2,297,573  9/1942  MacDonald et al. ............... 198/620
3,331,488  7/1967  Wellman ............................. 198/624

FOREIGN PATENT DOCUMENTS 758999  4/1934  Fed. Rep. of Germany ...... 198/624

Primary Examiner—James G. Smith
Assistant Examiner—Douglas D. Watts
Attorney, Agent, or Firm—Birch, Stewart, Kolasch & Birch

[57] ABSTRACT

A feeding device for controlled feeding of objects (R) from an inlet (9) to a outlet (11) by means of a feeding means consistituted by two cooperating feeding wheels (4,5). One of the feeding wheels (4) has a guiding groove (21), and the other feeding wheel (5) has two round belts (17a,17b) laid around the wheel, and stationary guide plates (26,27) preferably extend between the belts in the nip and merge with the inlet and/or the outlet.

36 Claims, 4 Drawing Figures

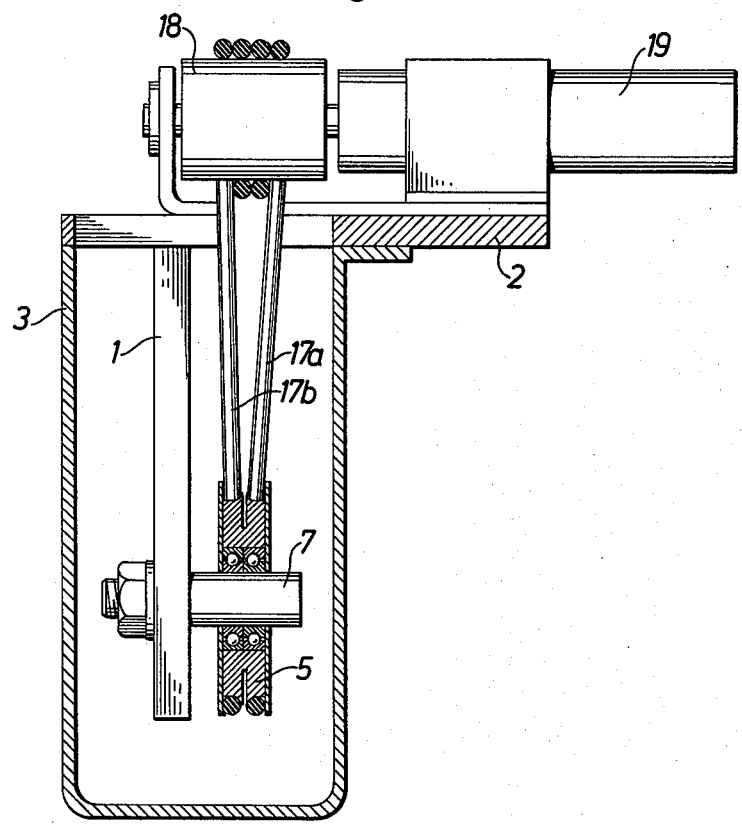
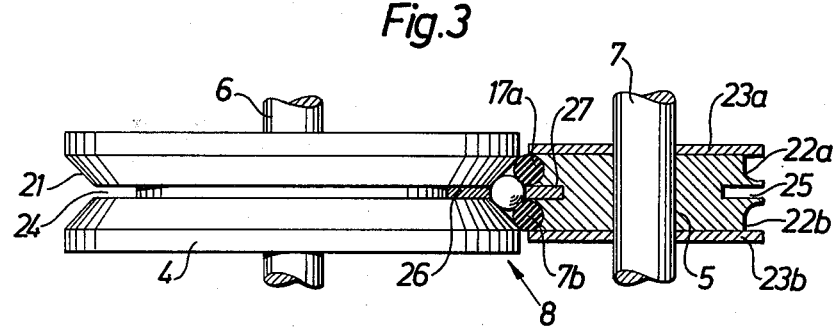

FEEDING DEVICE

BACKGROUND AND SUMMARY OF THE INVENTION

The invention relates to a feeding device for feeding a plurality of objects.

The background of the invention is the need to achieve a secure and rapid feeding of rather small objects, in particular rollers for roller bearings, in connection with mass production and treatment of such objects.

A previously known kind of feeding device comprises feeding means in the form of two opposed, rotating friction discs, between which the objects are fed while being frictionally engaged by the rotating discs. However, this known device has a substantial disadvantage in that a desired frictional engagement cannot always be maintained for a long period of operation, and the feeding may be disturbed with consequent drawbacks such as the need for adjustment of the friction discs and interruptions of all the units included in a production line.

As appears from the Swedish patent application No. 7714299-0, in order to avoid these drawbacks, a feeding device has been designed which comprises an endless belt serving as feeding means and being provided with conveying means, said belt being arranged to embrace, with the side provided with the conveying means, a re-directing guiding member provided with a guiding groove for the objects. The guiding member is constituted by a rotatable wheel, and the objects are fed forward in that they are obliquely positioned while changing their direction in the guiding groove of the wheel, the conveying means engaging with an edge or the like on each object.

The device has turned out to operate excellently for large and medium-sized rollers for roller bearings. However, problems have arisen when trying to use the device for rather small rollers. Thus, the latter have a tendency to lose their well-arranged mutual orientation while being re-directed, and furthermore the guidance in the region adjacent the feeding outlet has not been solved in a satisfactory way.

The object of the invention is therefore to achieve a feeding device operating satisfactorily even for rather small objects, in particular rollers for roller bearings.

This object is achieved by a feeding device with the features stated in the claims. Additional suitable features and embodiments will appear from the detailed description below.

BRIEF DESCRIPTION OF THE DRAWING

The invention is described more fully below with reference to the drawings, which illustrate a preferred embodiment.

FIG. 3 shows a fractional section along the line III—III in FIG. 1; and

FIG. 4 shows a section along the line IV—IV in FIG. 1.

DETAILED DESCRIPTION OF THE INVENTION

Figure 1:
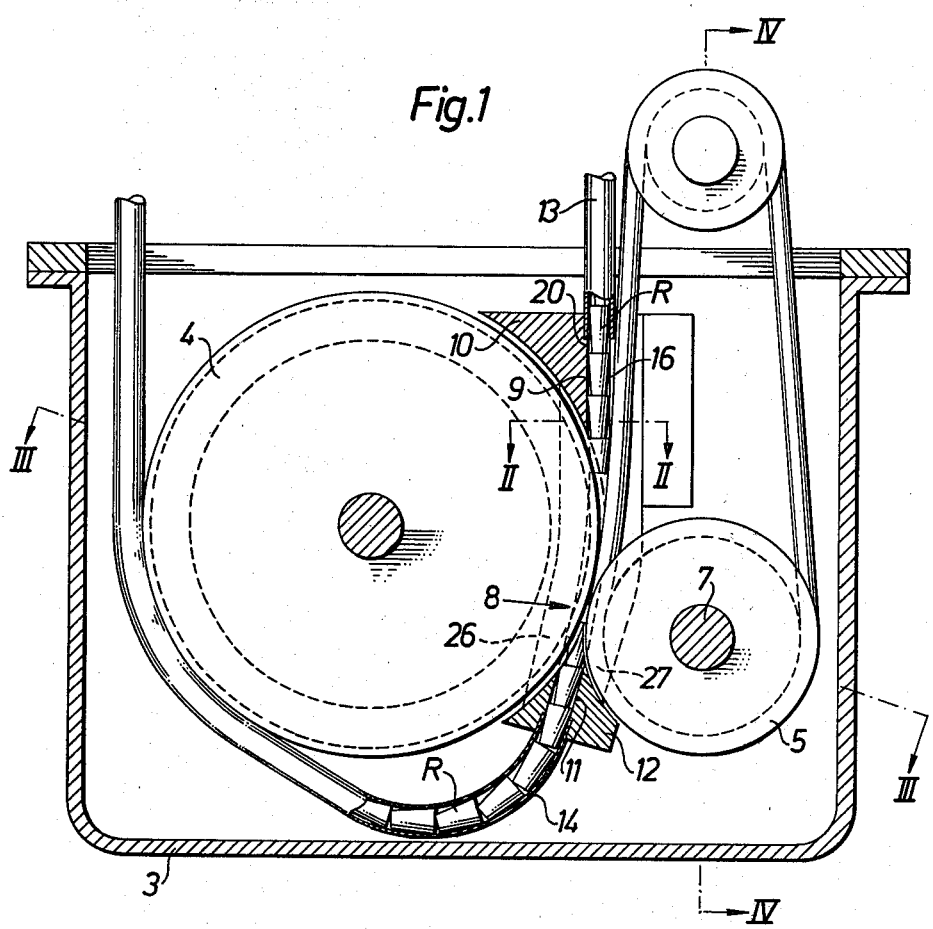
FIG. 1 shows a central section through a feeding device according to the invention.

The feeding device shown in the drawings comprises two support plates 1,2 made of aluminium sheet and arranged at an angle, one of the support plates 1 being substantially vertical, whereas the other support plate 2 is substantially horizontal (see FIG. 4). The means shown in FIG. 1 may, if desired, be enclosed in casing 3 or a housing.

On the vertical support plate 1, two feeding wheels 4,5 are each rotatably mounted by means of ball bearings on an axle journal 6,7, respectively, so as to permit them to rotate in a common plane (in parallel to the support plate 1) and to form a nip 8 in the section III—III in FIG. 1 (compare FIG. 3). Adjacent this nip 8, there is an inlet channel 9 in an upper inlet block 10 and an outlet channel 11 in a lower outlet block 12. These channels 9,11 are connected to tubes or hoses 13 and 14, respectively, for feeding through the objects in question. In the illustrated embodiment, these objects consist of rather small rollers (length appr. 4 mm, diameter appr. 3 mm) for roller bearings. The rollers R are inserted (in a way not shown) into the inlet hose 13 and are arranged in well-defined orientation relative to each other in the inlet channel 9, which is adapted to the diameter of the rollers in the inlet block 10.

Figure 2:
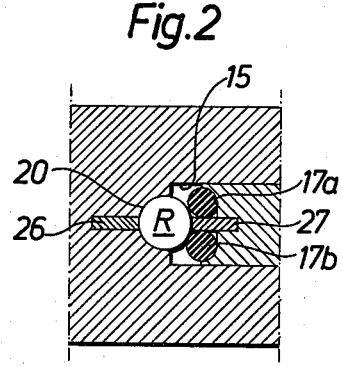
FIG. 2 shows a fractional section along the line II—II in FIG. 1.

As shown in FIGS. 1 and 2, the inlet block 10 has an approximately vertical, rather wide groove 15, which at 16 (FIG. 1) merges with the inlet channel 9. In the groove 15, there are two circular belts 17a, 17b (which form two portions of the same endless belt 17 of circular cross-section) of a soft resilient material such as polyurethane. The circular belts 17a, 17b extend at a certain mutual distance down through the nip 8 between the feeding wheels 4, 5 and further around the lower circumferential half of the feeding wheel 5, and from there upwards and a few turns around an upper driving roller 18, which is non-rotatably mounted on the shaft of a driving motor 19 (FIG. 4). This arrangement secures partly a good frictional engagement between the driving roller and the belt 17, and partly that the two downwardly moving runs 17a, 17b of the belts have equal belt tension, which is necessary for a perfect feeding of the rollers R.

Thus, at the point 16, each roller R reaches the two downwardly moving belt runs 17a, 17b, which contact obliquely from each side the mantle surface of the roller, so that the roller is guided towards the left (as seen in FIG. 1) wall 20 of the inlet channel 9. This wall 20 is curved somewhat in the longitudinal direction of the channel 9, namely slightly convexly outwardly towards the belt runs 17a,17b, and thus these runs will be in contact with the rollers R at a certain pressure in the entire merging region down to the nip 8. Thereby, a secure frictional engagement is achieved and any risk of slippage between the belts 17a,17b and the rollers R is avoided.

Thereafter, the rollers R enter into the nip 8 between the two feeding wheels 4,5, wherein each roller is partly in contact with an approximately V-shaped guiding groove 21 in the circumferential surface of the roller 4 and partly in contact with the two belt runs 17a, 17b, which rest partly on each one of the feeding wheel 5 surfaces 22a and 22b, respectively, sloping away from the roller, and partly axially outwardly against resilient end walls 23a, 23b on the wheel 5. These end walls 23a, 23b consist of thin sheets which are fastened to the center of the wheel and can be resiliently flexed outwardly in the region of the belt runs so as to accomodate dimensional variations of the rollers R.

The two feeding wheels 4,5 are in their common central plane provided with circumferential slot grooves 24,25 dimensioned to receive stationary guiding plates 26,27 which are mounted above and below in the inlet and outlet blocks 10,12, respectively. The guiding plates 26,27 which have inlet and exit guiding portions are located in said central plane and extend in the longitudinal direction of the inlet and outlet channels 9,11 while merging with the opposite wall portions of these channels (see FIGS. 1 and 2). Thus, the rollers R can be effectively guided by the guiding plates 26,27 in the critical transition regions between each feeding channel 9,11 and the nip 8. Thus, at the inlet side the rollers R are guided between on the one hand the guiding plate 26 and on the other hand the belt runs 17a, 17b (or the guiding plate 27 in case the belt runs yield away resiliently), whereas at the outlet side the rollers R are guided between the guiding plates 26,27 in the critical transition region between the nip 8 and the outlet channel 11.

In case the guiding plates 26,27 have a rather small clearance relative to the surrounding walls in each slot groove 24,25, they can also be used for adjusting the feeding wheels 4,5 axially, wherein the feeding wheels 4,5 preferably are freely mounted axially on each axle journal.

The device described above has turned out to operate very well when rapidly feeding small rollers one after the other, even after a long period of operation. As to the advantages, it should be mentioned that the feeding passage in the nip 8 is rather recti-linear, which is advantageous for very short as well as very long objects, since a redirection of such objects in a strongly curved path normally involves problems such as misorientation or substantial obliquity causing break downs, wear, etc.

I claim:

1. A feeding device for feeding a stream of rotationally symmetrical objects, comprising:
   first rotatable wheel means for feeding a stream of rotationally symmetrical objects, said first wheel means having a guiding groove on the circumferential surface thereof adapted to receive and contact said objects;
   second rotatable wheel means for driving a belt means, said second wheel means cooperating with said first wheel means in a common plane to form a nip at said common plane between said first and second wheel means, respectively;
   inlet means for supplying said objects to said nip;
   stationary exit guide means having stationary surfaces for maintaining and guiding said stream of objects away from said nip;
   outlet means for discharging said objects away from said guide means; and
   belt means arranged on said second wheel means for feeding said objects through said nip from said inlet means to said outlet means, said belt means comprising first and second belt portions arranged on each side of said common plane to resiliently and obliquely contact and frictionally engage said objects in cooperation with said guiding groove of said first wheel means.

2. A feeding device according to claim 1, and further comprising means located in said common plane and extending between said first and second belt portions for separating said first and second belt portions.

3. A feeding device according to claim 1, and further including stationary inlet guiding means for guiding said objects to said nip.

4. A feeding device according to claim 1, and further comprising stationary inlet guiding means extending between said belts in said nip for guiding the objects to said nip.

5. A feeding device according to claim 3, wherein said stationary inlet guiding means merges with said inlet means to guide said objects toward said nip.

6. A feeding device according to claim 1, wherein said exit guide means merges with said outlet means to guide said objects away from said nip.

7. A feeding device according to claim 3, wherein said inlet guiding means and said exit guide means merge with said inlet means and said outlet means, respectively, to guide said objects toward and away from said nip, respectively.

8. A feeding device according to claim 4, wherein said second wheel means contains a circumferential slot groove into which said stationary inlet guiding means extends.

9. A feeding device according to claim 8, wherein each of said belt portions are circular in cross-section and wherein said second wheel means contains a pair of sloping surfaces on either side of said circumferential slot groove, said surfaces being adapted to contact each of said belt portions, respectively.

10. A feeding device according to claim 1, wherein said second wheel means contains a pair of resilient end walls arranged on the axially outward portion of said second wheel means.

11. A feeding device according to claim 3, wherein said first wheel means has a circumferential slot groove in said guiding groove adapted to receive said stationary inlet guiding means.

12. A feeding device according to claim 11, wherein said stationary inlet guiding means merges with said inlet means to guide said objects toward said nip.

13. A feeding device according to claim 11, wherein said exit guide means merges with said outlet means to guide said objects away from said nip.

14. A feeding device according to claim 11, wherein said inlet guiding means and said exit guide means merge with said inlet means and said outlet means, respectively, to guide said objects toward and away from said nip, respectively.

15. A feeding device according to claim 1, wherein said belt means is arranged around said second wheel means and around at least one driving or redirecting roller wherein said belt portions are located in a transition region between said nip and said inlet means.

16. A feeding device according to claim 1, which includes a transition region between said nip and said inlet means and wherein said inlet means contains a guiding wall which curves toward said belt portions to urge said objects toward said belt portions with a certain pressure in said transition region.

17. A feeding device according to claim 1, wherein said belt means is an endless belt.

18. A feeding device according to claim 17, wherein said endless belt has a substantially circular cross-section.

19. A feeding device according to claim 1, wherein each of said belt portions has a substantially circular cross-section.

20. A feeding device according to claim 17, 18 or 19 wherein said belt means is made of a soft resilient material.

21. A feeding device according to claim 1, wherein said belt portions are resiliently mounted in an axial direction on said second wheel means.

22. A feeding device according to claim 1, wherein said guiding groove in said first wheel means is V-shaped.

23. A feeding device according to claim 1, which is adapted to feed rollers for roller bearings.

24. A feeding device for feeding a stream of rotationally symmetrical objects, comprising:
- first rotatable wheel means for feeding a stream of rotationally symmetrical objects, said first wheel means having a guiding groove on the circumferential surface thereof adapted to receive and contact said objects;
- second rotatable wheel means for driving a belt means, said second wheel means cooperating with said first wheel means in a common plane to form a nip at said common plane between said first and second wheel means, respectively;
- belt means arranged on said second wheel means for feeding said stream of objects through said nip, said belt means comprising first and second belt portions arranged on each side of said common plane, each of said belt portions being arranged to obliquely contact and frictionally engage the objects in cooperation with said guiding groove of said first feeding wheel; and
- stationary exit guide means having stationary surfaces for maintaining and guiding said stream of objects away from said nip.

25. A feeding device according to claim 24, and further including means located in said common plane for separating said first and second belt portions.

26. A feeding device according to claim 25, wherein said guiding groove contacts said objects on each side of said common plane.

27. A feeding device according to claim 26, wherein said guiding groove is V-shaped.

28. A feeding device according to claim 24, wherein said belt portions resiliently contact said objects in order to accommodate dimensional variations in the objects being fed.

29. A feeding device for feeding a stream of rotationally symmetrical objects, comprising:
- first rotatable wheel means for feeding a stream of rotationally symmetrical objects, said first wheel means having a guiding groove on the circumferential surface thereof adapted to receive and contact said objects;
- second rotatable wheel means for driving a belt means, said second wheel means cooperating with said first wheel means in a common plane to form a nip at said common plane between said first and second wheel means, respectively;
- belt means arranged on said second wheel means for feeding said stream of objects through said nip, said belt means comprising first and second belt portions having a substantially circular cross-section arranged on each side of said common plane to obliquely contact and frictionally engage said stream of objects in cooperation with said guiding groove of said first wheel;
- inlet means for directing said stream of objects to said nip; and
- stationary exit guide means having stationary surfaces for maintaining and guiding said stream of objects away from said nip.

30. A feeding device according to claim 29, wherein said belt portions are arranged to contact and guide said objects in a transition region between said inlet means and said nip.

31. A feeding device for feeding a plurality of rotationally symmetrical objects, comprising:
- first rotatable wheel means for feeding a stream of rotationally symmetrical objects, said first wheel means having a guiding groove on the circumferential surface thereof adapted to receive and contact said objects;
- second rotatable wheel means for driving a belt means, said second wheel means cooperating with said first wheel means in a common plane to form a nip at said common plane between said first and second wheel means, respectively;
- inlet means for supplying said objects to said nip;
- stationary exit guide means having stationary surfaces for maintaining and guiding said stream of objects away from said nip;
- outlet means for discharging said objects away from said guide means; and
- belt means arranged on said second feeding wheel for feeding the objects through said nip from said inlet means to said outlet means wherein the objects are arranged with their rotational axis in the direction of feeding, said belt means comprising first and second belt portions arranged on each side of said common plane to resiliently and obliquely contact and frictionally engage the objects in cooperation with said guiding groove of said first feeding wheel.

32. A feeding device according to claim 31, and further comprising stationary inlet guiding means which merges with said inlet means for guiding said objects toward said nip.

33. A feeding device according to claim 31, wherein said exit guide means merges with said outlet means to guide said objects away from said nip.

34. A feeding device according to claim 32, wherein said inlet guiding means and said exit guide means merge with said inlet means and said outlet means, respectively, to guide said objects toward and away from said nip, respectively.

35. A feeding device according to claim 31, wherein each of said belt portions has a substantially circular cross-section.

36. A feeding device according to claim 31, wherein said guiding groove in said first wheel means is V-shaped.

* * * * *